(12) United States Patent
Yandrofski et al.

(10) Patent No.: US 6,205,340 B1
(45) Date of Patent: *Mar. 20, 2001

(54) CRYOELECTRONIC RECEIVER FRONT END FOR MOBILE RADIO SYSTEMS

(75) Inventors: Robert M. Yandrofski, Broomfield; Gerhard A. Koepf, Boulder; David O. Patton, Louisville, all of CO (US)

(73) Assignee: Spectral Solutions, Inc., Louisville, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/694,772

(22) Filed: Aug. 9, 1996

Related U.S. Application Data

(60) Provisional application No. 60/002,065, filed on Aug. 9, 1995, and provisional application No. 60/013,942, filed on Mar. 22, 1996.

(51) Int. Cl.[7] ............................. H04B 1/38; H04M 1/00
(52) U.S. Cl. ......................... 455/561; 455/117; 455/217
(58) Field of Search .................................. 455/217, 117, 455/103, 128, 129, 66, 344, 347, 280, 282, 8, 561, 562; 343/890; 333/99 R, 99 S, 24 R; 62/51.1, 259.2, 331; 330/289, 207 P

(56) References Cited

U.S. PATENT DOCUMENTS

| | | | |
|---|---|---|---|
| 3,564,546 | 2/1971 | Barney et al. | 343/18 |
| 3,694,753 | 9/1972 | Arndt | 325/373 |
| 3,730,967 | 5/1973 | Nicol | 174/15 C |
| 3,902,143 | 8/1975 | Fletcher et al. | 333/21 R |
| 3,931,623 | 1/1976 | Sones et al. | 343/225 |
| 4,494,244 | 1/1985 | Arndt et al. | 455/78 |
| 4,763,132 | 8/1988 | Juds et al. | 343/890 |
| 4,996,188 | 2/1991 | Kommrusch | 505/1 |
| 5,006,825 | 4/1991 | Guilbert et al. | 333/245 |
| 5,010,304 | 4/1991 | Mueller et al. | 330/269 |
| 5,020,138 | 5/1991 | Yasuda et al. | 455/115 |
| 5,120,705 | 6/1992 | Davidson et al. | 505/1 |
| 5,123,080 | 6/1992 | Gillett et al. | 388/934 |
| 5,215,959 | 6/1993 | Van Duzer | 505/1 |
| 5,244,869 | 9/1993 | Billing | 505/1 |
| 5,347,168 | 9/1994 | Russo | 307/245 |
| 5,472,935 | 12/1995 | Yandrofski et al. | 505/210 |
| 5,604,925 | 2/1997 | O'Malley et al. | 455/254 |

OTHER PUBLICATIONS

U.S. Statutory Invention Registration, Conrad, Reg. No. H653, Published Jul. 4, 1989.

Little et al., Development of A Low Cost, Cryogenic Refrigeration System For Cooling Of Cryoelectronics; Adv. Cryog. Eng. 1994.

Westerveld, Rudi, and Ramjee Prasad; *Rural Communications in India Using Fixed Cellular Radio Systems*; IEEE Communications Magazine; Oct. 1994; pp. 70–77.

Goodman, David J.; *Trends in Cellular and Cordless Communications*; IEEE Communications Magazine; Jun. 1991; pp. 31–40.

Whitehead, James F., *Cellular System Design: An Emerging Engineering Discipline*; IEEE Communications Magazine; Feb. 1986; pp. 8–15.

(List continued on next page.)

*Primary Examiner*—Nguyen Vo
(74) *Attorney, Agent, or Firm*—Sheridan Ross P.C.

(57) ABSTRACT

The present invention relates to a novel use of cryoelectronic equipment to implement an extremely sensitive and stable receiver front end for UHF, microwave, and millimeter wave applications. The invention is particularly applicable to base station receivers in mobile radio systems, where the range and capacity of the systems are typically limited by the base station receiver sensitivity.

35 Claims, 12 Drawing Sheets

OTHER PUBLICATIONS

Kohno, Ryuji, Rueven Meidan, and Laurence B. Milstein; *Spread Spectrum Access Methods for Wireless Communications*; IEEE Communications Magazine; Jan. 1995; pp. 58–67.

Padgett, Jay E., Christoph G. Günther, and Takeshi Hattori; *Overview of Wireless Personal Communications*; IEEE Communications Magazine; Jan. 1995; pp. 28–41.

Andersen, Jørgen Bach, Theodore S. Rappaport, and Susumu Yoshida; *Propagation Measurements and Models for Wireless Communications Channels*; IEEE Communications Magazine; Jan. 1995; pp. 42–49.

Bhasin, K.B., S.S. Tonchich, C.M. Chorey, R.R. Bonetti and A.E. Williams;*Performance of Y–Ba–Cu–O Superconducting Filter/GaAs Low Noise Amplifier Hybrid Circuit*; IEEE MTT–S Digest; 1992; pp. 481–483.

*Conductus Demonstrates Thin–Film 19–Pole Microwave Filter*; Superconductor Week; Mar. 27, 1995; p. 6.

Drolet; D., S. Meszaros, M.G. Stubbs and J.S. Wight; *A Hydrid high–Tc superconductor K–band amplifier with filter*; presented at the 22nd European Microwaves Conference, Sep. 6–9, 1993 at Madrid, Spain.

Barnes et al., *Some Microwave Applications of Basrti03 and High Temperature Superconductors* Integrated Ferroelectrics, 8:171–184 (1995).

Dogan et al., *PCS trailblazers take on risks for chance at bountiful market* Radio Communications Report, 14(18), 3 pages (1995).

Garg et al., *3,4 Wideband Systems* AT&T "Wireless and Personal Communications Systems", pp. 39–43, 85, 88–89, 127, 132–135, 151–153 (Prentice–Hall pub.) 1996.

Kchao et al., *Analysis ofa direct–Sequence Spread–Spectrum Cellular Radio System* IEEE Transactions on Communications, 41(10):1507–1516 (1993).

Viterbi et al., *Performance of Power–Controlled Wideband Terrestrial Digital Communication* IEEE Transactions on Communications, 41(4):559–568 (1993).

"Superconductivity News", *Illinois Superconductor Receives Second Patent on Thick Film HTS* and *Conductus Reports Fiscal Year Results* vol. 8, No. 7, pp. 1–2, Feb. 19, 1996.

O Hanlon; "A User S Guide to Vacuum Technology"; *A Wiley–Interscience Publication*; pp. 230–236.

CRYOELECTRONIC RECEIVER FRONT END FOR MOBILE RADIO SYSTEMS

The present application claims priority under 35 U.S.C. §119 (e) from copending U.S. Provisional Application Ser. Nos. 60/002,065 and 60/013,942, both entitled "Cryoelectronic Receiver Front End for Mobile Radio Systems," filed Aug. 9, 1995 and Mar. 22, 1996, respectively, each incorporated herein by reference in their entireties.

FIELD OF THE INVENTION

The present invention relates generally to base station receivers for communication applications and specifically to a receiver front end for base stations used in mobile ratio systems.

BACKGROUND OF THE INVENTION

In terrestrial mobile radio systems of cellular, PCS or other type, geographical areas are subdivided into a number of cells. The communications traffic in each cell is supported by a base station and each base station has assigned to it a multiplicity of RF carriers. In such cellular mobile radio systems that operate at UHF and higher frequencies, the size of the cells is determined by terrain features (there can not be major obstructions between the mobile station and the base station), network capacity requirements (the number of users the system needs to support), and the base station receiver sensitivity (limited by losses and noise generated in the base station receiver front end). In such cellular mobile radio systems, cells are called capacity cells when their size is determined by traffic requirements, and cells are called coverage cells when their size is determined by the base station receiver sensitivity and the terrain. Furthermore, a distinction is made between the forward link, which is the radio signal transmitted from the base station to the mobile station, and the reverse link, which is the radio signal transmitted from the mobile station to the base station.

In the reverse link, the mobile station typically transmits 10 to 100 times less power than the base station transmits in the forward link. Therefore, the received signal strength at the base station is much lower than the received signal strength at the mobile station. In situations where the base station range is limited by the reverse link signal strength, the base station is identified as reverse link limited. Likewise, in forward link limited cells the range is limited by the strength of the signal received at the mobile station.

Mobile radio networks are designed for balanced forward and reverse links, i.e., equal base station range in both directions. This balance is based on the assumption that all cells are at full capacity. However, many operational networks are not at full capacity. Under these conditions, the base station transmitter can be driven harder to provide an increased range for the forward link. The cell is then reverse link limited.

Specialized Mobile Radio (SMR) base stations and rural cellular base stations are typically reverse link limited. In particular, many existing cellular base stations are reverse link limited because they were designed for car phones transmitting at about 8 Watts, while the majority of mobile stations today are battery operated hand-held phones, which transmit at much lower power levels (0.6 Watt in the US and 2 Watts in Europe).

Reverse link limitations in specific existing cells due to terrain can be overcome by increasing the antenna tower height at the base station. More general, construction of additional base stations or repeater sites is necessary. Both these approaches have major disadvantages: increasing the height of the receive antennas on the tower is typically not possible without replacing the entire tower and may violate zoning regulations. Building additional base stations or repeater sites is expensive and also requires a reassignment of the frequency reuse pattern of the network.

In capacity limited cellular networks, additional demand in the number of users can be met by adding new frequency channels to the existing cell sites if the additional channels are available. In networks where all channels are in use the only solution is splitting existing cells into smaller ones, and correspondingly, adding additional base stations and reassigning the frequency reuse pattern.

SUMMARY OF THE INVENTION

It is an objective of the present invention to disclose receiver front end circuitry that can provide significantly increased base station sensitivity for receiving reverse link signals from mobile stations. A related objective is to minimize the noise contributions from cable losses in the base station receive path which also increases the base station reverse link sensitivity compared to existing base stations.

Another objective is to reduce the number of base stations in coverage networks thereby reducing the installation and maintenance cost of such networks relative to existing cellular mobile radio systems.

Another related objective is to reduce the mobile station transmit power in coverage or capacity networks by increasing the base station receiver sensitivity.

It is a further objective to provide base station receiver front end circuitry with improved RF filter characteristics to reduce interference. This feature increases spectrum utilization providing increased capacity and revenue relative to existing base stations.

Yet another related objective is to operate said receiver front end circuitry in a thermally stable environment to avoid variations degradation in performance, and failure due to ambient temperature fluctuations.

An additional objective relating to some digital cellular mobile radio systems is to increase network capacity. These and other objectives are achieved in the present invention which provides a receiver front end for a base station. The receiver front end includes: (1) filtering means for spectrally filtering an RF signal to form a filtered RF signal; (2) amplifying means, in communication with the filtering means, for amplifying the filtered RF signal; and (3) cooling means for cryogenically cooling the filtering means and the amplifying means. The receiver front end is substantially adjacent to the antenna to maintain the insertion loss along a transmission line extending between the antenna and amplifying means at or below a predetermined level. In one embodiment, the receiver front end is mounted on a structure supporting the antenna or antenna structure. The filtering and/or amplifying means can include circuitry which uses thin film superconducting passive electronic components and cryogenically cooled active semiconductor components. The cooling means can be a closed or open cycle refrigerator. The cooling means can maintain the filtering means and amplifying means at a stable temperature that is independent of the temperature of the environment external to the cooling means. The filtering means, amplifying means, and cooling means will hereinafter be referred to as the cryoelectronic receiver front end or the receiver front end. In one embodiment, the cryoelectronic receiver front end consists at a minimum of a spectral filter and a low noise amplifier, either or both of which can include a superconducting material for the passive components of the circuit.

To understand the performance advantages of the present invention, it is important to relate base station sensitivity with the base station noise figure. The sensitivity is described as the RF signal power level needed at the receive antenna port to detect a single telephone channel with a given signal quality. Frequently, in digital mobile radio systems, this signal quality is described by a frame error rate not exceeding one percent.

This error rate is a strong function of the signal to noise ratio as measured, for example, before the demodulator, and is thus strongly dependent on the noise power. The noise power in turn, is composed of noise received by the antenna and noise added by the RF receiver front end circuitry. The latter can be measured with standard techniques and is typically expressed as a noise figure value. The more noise added by the receiver, the larger the base station noise figure, the larger the total noise power at the demodulator, and the lower the sensitivity of the base station.

Cryogenic cooling significantly decreases RF losses in passive electronic circuits thereby reducing the thermal noise, also known as Johnson noise. As is also well known, Johnson noise generated in passive components is equal to the component loss when the component is operated at room temperature, but decreases substantially below the loss value when the component is operated at cryogenic temperature. Additionally, the losses in normal metals decrease with temperature, and the RF losses of superconducting metals when cooled below the transition temperature, are orders of magnitude lower than that of normal metals. The noise mechanisms intrinsic to a variety of semiconductor transistor designs, such as those used in low noise amplifiers, are also temperature dependent, and decrease with decreasing temperature. For example, the noise figure of PHEMT GaAs low noise amplifiers is known to substantially decrease when operated at cryogenic temperature.

In addition to the use of cryoelectronic components with extremely low noise temperature, in the present invention, the RF feed line losses between the receive antenna and the cryoelectronic receiver front end are substantially minimized by locating the cryoelectronic receiver front end on the antenna mast in close proximity to the receive antenna structure. In cellular base stations it is common practice to locate all base station electronics including the receiver front end at the base of the antenna mast. Depending on the height of the mast, a substantial length of RF feed line (typically coaxial cable) is used to connect the receiver front end to the antenna port. This cable causes insertion losses that directly add to the base station noise figure. In the typical embodiment of the invention, the cryoelectronic receiver front end is mounted on the antenna support structure itself. Preferably, the insertion loss along the transmission line extending between the antenna and the receiver front end is no more than about 1.0 db and more preferably no more than about 0.5 db.

The noise figure of the cryoelectronic receiver front end of the present invention is preferably no more than 1.5 dB, more preferentially no more than 1.0 dB, and most preferably no more than about 0.7 db. This compares with noise figures in the range of 3 to 8 dB in existing base stations. With respect to base stations sensitivity, this corresponds to a 2 to 7 dB improvement over the existing state of the art. The concomitant increase in reverse link range in cellular applications is preferably at least about 110%, more preferably at least about 120%, and most preferably at least about 140% of the reverse link range of conventional systems (i.e., with no tower-mounted cryoelectronic receiver front end).

The use of superconducting material in the RF spectral filter provides not only high sensitivity but also improved spectral definition of the cellular band. Ideal bandpass filters have rectangular profiles. Actual filters have sloping skirts and in-band ripple. The low losses of superconducting material allow the fabrication of very small filter circuits with steep skirts and low in-band ripple. When used in mobile cellular radio system, such filters allow better use of the available spectrum, as more channels can be accommodated at the band edges without increased interference from adjacent bands. The small size of the superconducting planar filters allows use of more complex filter functions to be performed without increasing the size of the mast head cryoelectronic receiver front end and without significant loss in sensitivity. For example, combinations of bandpass and bandreject filters may be used in base stations where strong out-of-band interference signals need to be suppressed. Also, sharper filters can be used to more accurately define specific receive bands or parts thereof. For example, it is customary in the new cellular PCS systems to use 60-MHz wide filters. This corresponds to the entire PCS base station receive band. In actuality, each licensee only uses a small part of this spectrum, i.e., either a 15 MHz or a 5 MHz wide band. Superconducting filters can easily provide the selectivity for these narrower bands with only a minor increase in noise figure.

Another benefit of the cryoelectronic receiver front end is the increased spurious free dynamic range compared with existing receiver front ends. This is the result of the increase in amplifier gain and the decrease in noise realized through cooling the circuit.

The present invention is applicable to all base station modulation and multiplexing formats, such as analog or digital modulation, frequency, phase or amplitude modulation, frequency-, time- and code-division multiplexing. The improved sensitivity may be utilized in different cellular mobile systems in different ways. The benefits include but are not limited to: balancing of reverse link limited cells; increasing base station range in coverage networks; increasing cell capacity; better reception of signals transmitted through buildings and other structures; substantial reduction of degradation in receiver sensitivity caused by the insertion loss of the transmission line extending from the receiver front end to the base station because the RF signal is spectrally filtered and amplified before transmission along the line; and reducing handset transmit power levels for safety reasons, for increased talk time, and for better signal quality due to the higher linearity of the transmit amplifier.

The cryoelectronic receiver front end can readily be applied in cellular mobile radio systems designed to have balanced links. As the transmit power in the mobile stations is continuously adjusted to the minimum value for maintaining a certain reverse link quality, the use of the present invention allows mobile stations to operate at substantially reduced power levels. This increases the talk time for a given battery size, and reduces the power levels that users are exposed to.

In mobile radio systems that implement spread spectrum technology, such as code division multiplex systems, increased sensitivity of the base station receiver front end as provided with the present invention is known to significantly increase not only the cell size but also the capacity.

The filtering means and amplifying means in the receiver front end can be electronically tunable and/or located on a common substrate. The tuning means for tuning the filtering means can include a ferroelectric material.

The cooling means can include a cooling device, means for compressing a cooling fluid for use in the cooling device, and means for transporting the cooling fluid between the compressing means and the cooling device. The compressing means can be located near the base of the structure supporting the antenna, and the cooling device and receiver front end mounted on the upper part of the structure. In this manner, the compressing means can supply a number of cooling devices with cooling fluid. The cooling fluid can be transported to one or more cooling devices mounted on the structure by transmitting the cooling fluid through a conduit formed by the transmission line extending from the base station to the receiver front end.

To protect the cooling means and receiver front end from the environment, they can be enclosed in a weatherproof enclosure. The input and output ports in the enclosure for electrical conductors can be protected from power surges, such as by lightning, by lightning protection means. The enclosure can form an integral structure with the antenna, particularly with a patch array antenna.

The receiver front end can include switching means for bypassing the RF signal around the receiver front end in the event of malfunction of the cooling means and/or receiver front end. To activate the switching means, the receiver front end can include monitoring means for monitoring remotely the operation of the various components of the receiver front end.

For dual diversity reception, a second cooling means for cooling a second receiver front end can be employed. The antenna is in communication with the receiver front end and the second antenna with the second receiver front end. This configuration provides enhanced system reliability by providing separate cooling means for the receiver front ends in each sector.

In another configuration for servicing multiple antennas, a single cryostat can include a plurality of filtering means and a plurality of amplifying means. In this configuration, a filtering means and amplifying means are connected with each of a plurality of antennas.

In another embodiment, the present invention provides a method for processing a wireless signal transmitted by a mobile station. The method includes the steps of: (1) cryogenically cooling a receiver front end in the base station, with the temperature of cooling preferably being 90% or less of the transition temperature of a superconducting material in the receiver front end; (2) receiving the signal with the receiver front end; and (3) transmitting the received signal to the base station.

DETAILED DESCRIPTION

An important aspect of the present invention is the combined use of highly conductive materials, particularly superconducting electronic materials, and cryocooling devices in a mast mounted RF receiver front end, to realize substantial benefits in mobile radio systems, based on increased base station sensitivity combined with high spectral selectivity. An important aspect of the invention lies in the use of closed cycle refrigerators, particularly cryopumps, as the cryocooling devices. As used herein, a cryopump is a cryogenic refrigeration device that entrains molecules on a cooled surface by weak dispersion forces (e.g., entrainment of a gas by cryocondensation, cryosorption, or cryotrapping on a surface that is cooled by a liquid cryogen or a mechanical refrigerator).

Figure 1:
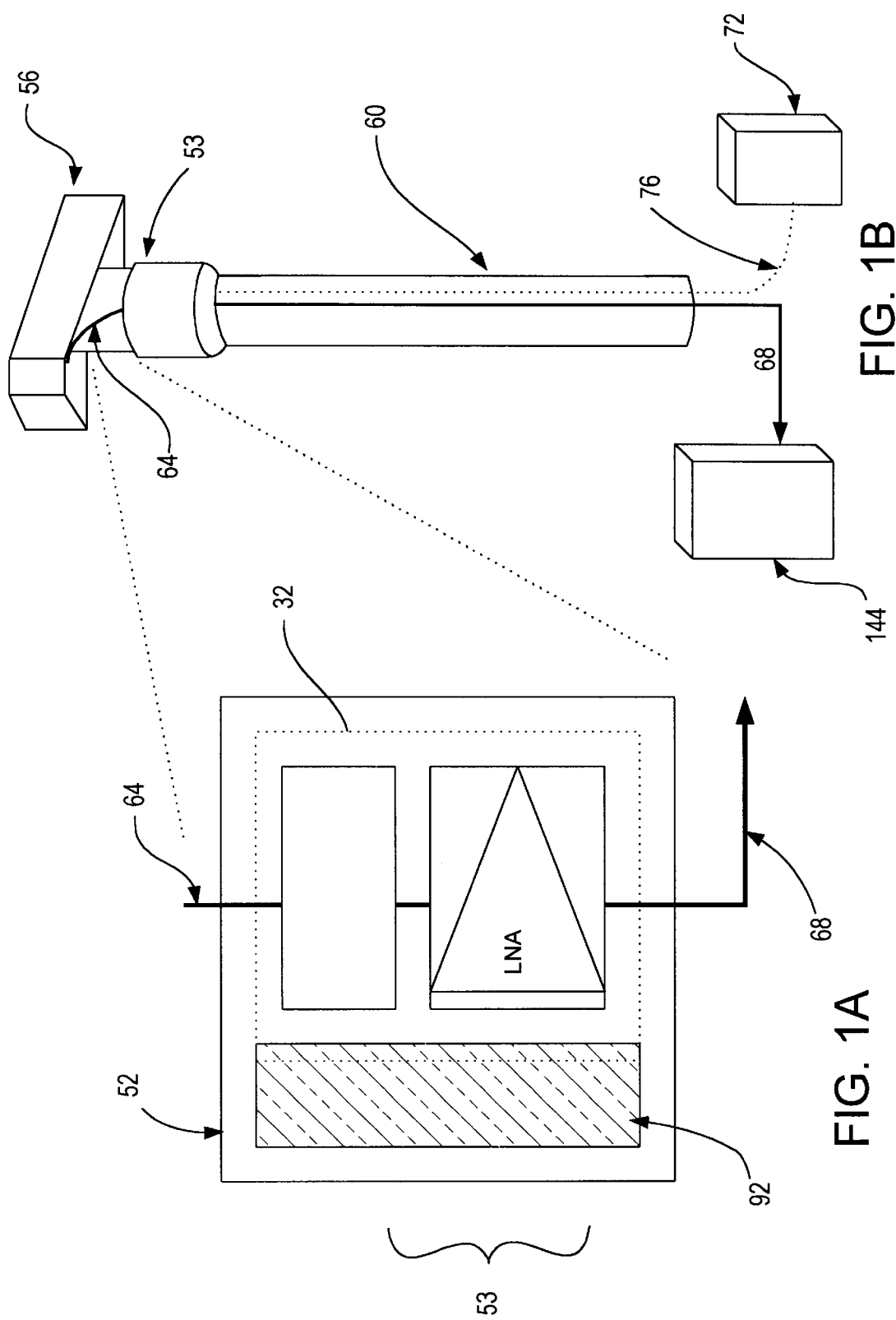
FIG. 1A is a block diagram of a cryoelectronic receiver front end.
FIG. 1B is a diagram of the receiver front end on an antenna mast in close proximity to a base station and a compressor.

FIG. 1 shows the cryoelectronic receiver front end of the present invention installed in a base station with antenna mast 60 supporting an antenna assembly 56. The cryoelectronic receiver front end consists of a mast mounted portion 53 of the receiver front end, a compressor 72, and a conduit 76 for the cooling fluid. The height of the antenna mast or tower varies with application but typically ranges from about 35 to about 200 feet. As will be appreciated, the height of the tower structure can vary over a substantially broader range for microcell applications.

In the shown embodiment, the closed cycle mechanical refrigerator used for cooling the electronics to cryogenic temperatures consists of two parts, one being a compressor 72, and the other being a cold head assembly located inside the mast mounted portion 53. This type of refrigeration system is known as a Gifford McMahon refrigerator. In this configuration, the compressor 72 is connected to the receiver front end in the mast mounted portion 53 via a cooling fluid transport conduit 76. It includes two gas lines providing a cooling fluid such as cryogen to the cold head and a return path back to the compressor. While this is the preferred embodiment of the refrigerator, other refrigeration systems may be used that consist of two separate parts, as pulse tubes, Joul-Thompson systems, or that consist of a single integrated part such as Sterling cycle refrigerators. Preferably, the refrigeration system is relatively inexpensive, has a heat lift of 5 watts or more at 70K, draws no more than about 800 to about 1,000 watts of power, and a life in excess of 1.5 years.

The advantages of using a cryopump such as the Gifford McMahon system are its high reliability and the fact that the remote compressor can be co-located at the base of the antenna mast with the base station, in an environmentally controlled location. Additionally, this configuration allows easy access to the compressor for repair and maintenance functions. As will be appreciated, Gifford McMahon systems have a gas compressor remotely located from an expander and connected with the expander (in the coldfinger) by two flexible, high-pressure hoses. The expander includes a cylindrical piston or displacer made from an insulating material. A regenerator is housed within the displacer which is in fluid communication with a space on either side of the displacer. The displacer moves up and down within a cylindrical housing. In operation, the cooling fluid is introduced into the regenerator via the upper space when an inlet valve is opened and the displacer is at the extreme lower end of the housing. The cooling fluid is cooled as it passes through the regenerator and the cooled fluid enters into the lower space causing the displacer to rise. The output valve is opened to allow the fluid to expand and cool. The displacer is lowered as the fluid exits through the output valve and the process is repeated. The reliability of the system results from maintaining a low pressure differential across the seals in the displacer (i.e., across the upper and lower ends of the displacer), the use of room temperature input and output valves, and the complete removal of entrained compressor lubricating fluid from the cooling fluid.

Again referring to FIG. 1, the base station is connected to the antenna assembly and to the mast mounted portion 53 of the receiver front end via cable assembly 68. Furthermore, cable assembly 64 connects the receiver front end 52 to the antenna assembly 56, preferentially with ultra-low loss coaxial cables. The quality and length of the coaxial cables 64 is selected in such a way as to minimize the insertion loss. Preferably, the insertion loss along cable assembly 64 is no more than about 1.0 dB, more preferably less than about 0.5 db, and most preferably no more than about 0.7 db.

Functionally, the cryoelectronic receiver front end is in the receive path of the base station. Signals from the mobile station are being collected by the receive antennas in the antenna assembly, pass through the cryoelectronic receiver front end, and then pass to the RF receiver in the base station via coaxial cables 68. In the basic embodiment of the invention, the base station RF transmitter is connected directly to the transmit antennas in the antenna assembly without passing through the cryoelectronic receiver front end.

The mast mounted portion 53 of the cryoelectronic receiver front end as shown in FIGS. 1A and 1B, contains the cold head assembly which is a cold head 92, and attached to it, cryostat 32. For protection of these components from environmental effects, the cryoelectronic receiver front end includes a weatherproof enclosure 52 with connectors (not shown) for the RF-, power and signal cables and gas lines 76. The enclosure is relatively compact, typically having a height of no more than about 20 inches and, for cylindrically shaped enclosures, a diameter of no more than about 10 inches. The cryostat is also relatively compact, typically having a height of no more than about 18 inches and a diameter of no more than about 8 inches.

The cryostat inside the cryoelectronic receiver front end includes a multiplicity of cryoelectronic modules in correspondence to the multiplicity of receive antennas in the antenna assembly. Typical wireless base stations have three independent sectors, each with two receive antennas for dual diversity, requiring six cryoelectronic modules. Each module is then connected to one specific receive antenna via a low loss coaxial cable 64. Cable assembly 68 then includes transmit cables connected to the transmit antennas and six receive cables connected directly to the cryoelectronic receiver front end. Other base stations, particularly in coverage networks use omni antennas, in which case two cryoelectronic modules may be needed for dual diversity reception. The benefit of packaging multiple cryoelectronic modules into one cryostat is the reduction in the number of cold heads needed to operate all modules at cryogenic temperatures. The limitation in the number of circuits that can be packaged in a single cryostat is the cooling power provided by the cold head, and the size of the modules. As the complexity and size of the cryoelectronic module increases it becomes increasingly more difficult to achieve a uniform temperature distribution.

Figure 2:
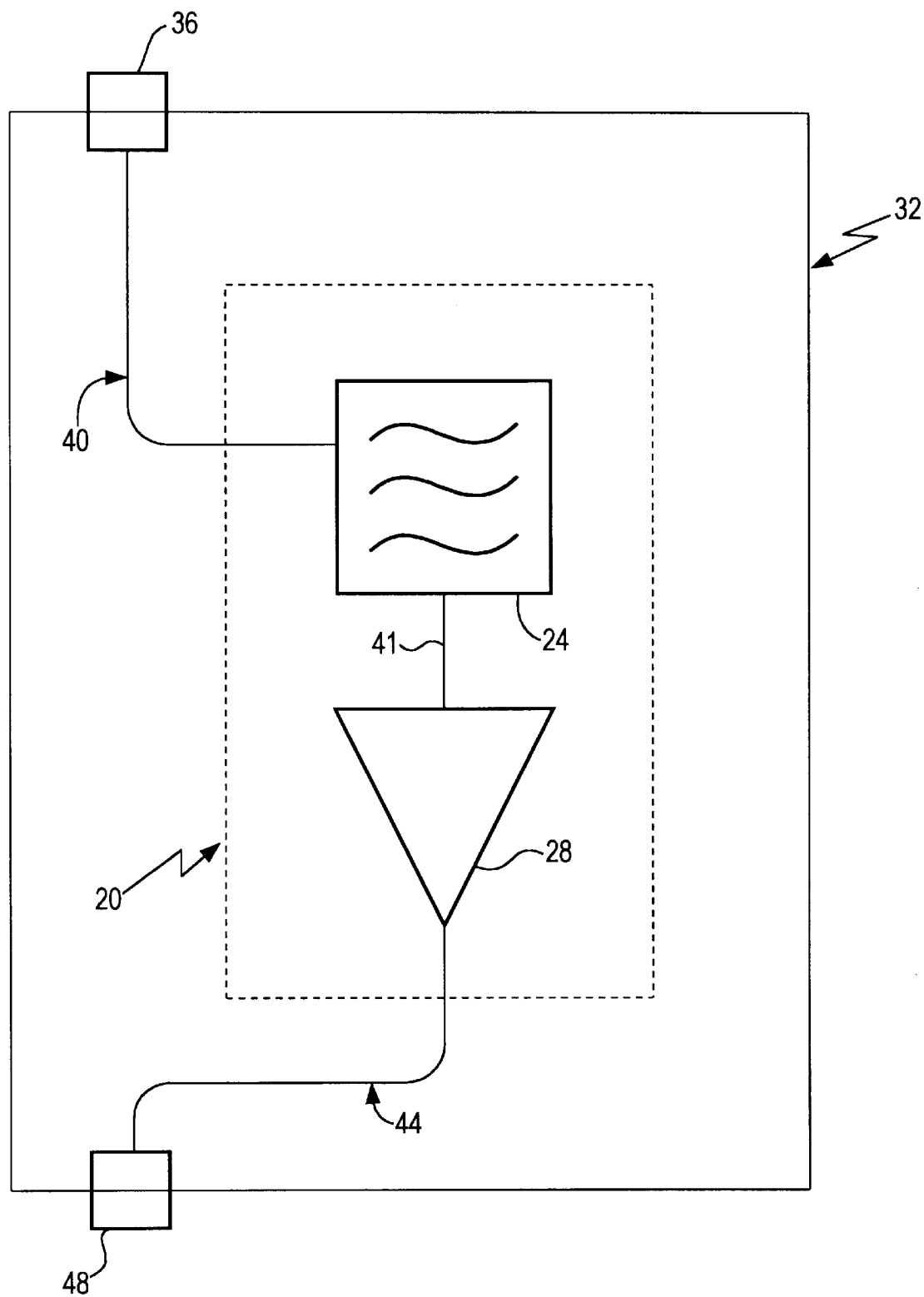
FIG. 2 is a block diagram of an embodiment of a cryostat and a cryoelectronic module.

In the basic embodiment of the invention, each cryoelectronic module includes a spectral filter and amplifier as shown in FIG. 2, with the filter and/or amplifier being fabricated with superconducting materials, such as yttrium barium copper oxide (YBCO) or other such compounds. FIG. 2 shows a block diagram of the basic embodiment of the cryostat as taught by the present invention. For simplicity only one cryoelectronic module is shown. The cryoelectronic module 20 includes a bandpass filter 24 and a low noise amplifier (LNA) 28 contained in a cryostat 32. The RF receive signal enters the cryostat 32 through a vacuum-tight RF feedthrough 36 and is guided to the band pass filter 24 via a short length of low-loss coaxial cable 40. The filtered signal is connected by a second length 41 of low-loss coaxial cable from the output of the filter to the input to the LNA 28. The filtered and amplified RF signal is then guided to the output RF feedthrough 48 via coaxial cable 44.

The band pass filter 24 is typically comprised of a superconducting circuit so as to minimize insertion loss and to provide sharp filter skirts. The frequency band passed by the superconducting filter is preferably matched to the spectral band licensed by the operator of the mobile radio network. For example, in United States PCS systems, the licensed bands are either 5 MHz or 15 MHz wide. The insertion loss of superconducting filter is preferably no more than about 0.5 db, and more preferably less than about 0.3 db. The LNA 28 may also be constructed as a superconducting planar hybrid circuit with the semiconductor device attached to a superconducting circuit board to improve performance and to further reduce metal losses. In other embodiments, more complex spectral filtering may be incorporated into the cryoelectronic module 20 and placed in the cryostat, to provide additional functionality to the base station receiver. The cryoelectronic module further may include other components, including but not limited to multi-couplers, diplexers, power dividers and splitters, limiters, mixers, phase shifters, and/or oscillators. These components may or may not be fabricated with superconducting metal as thin film planar circuits. The various circuits may be individually packaged or combined in larger packages.

The cryoelectronic modules 20 in the cryostat have a preferred operating temperature of 90% or less of the superconducting transition temperature of the superconducting material, more preferentially at or below 77K for YBCO and at or below 90K for TBCCO. It is further stabilized within a narrow temperature range of preferentially less than plus or minus 5K with respect to the operating temperature. Being operated in this way inside the cryostat, the cryoelectronic module exhibits stable RF performance over a wide range of ambient temperatures.

Figure 3:
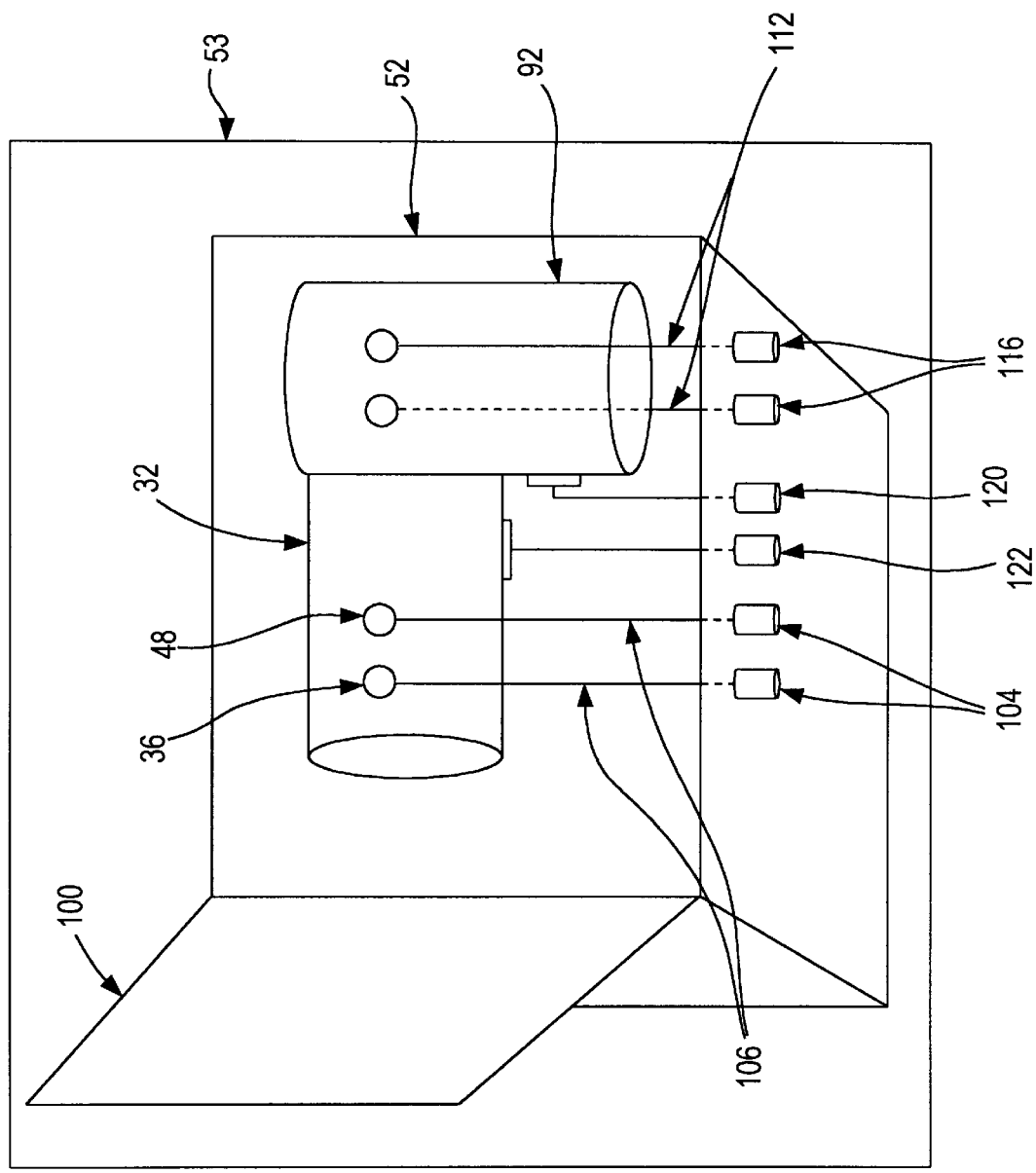
FIG. 3 is a view of an embodiment of a receiver front end contained in a weatherproof enclosure.

FIG. 3 shows a pictorial drawing of the mast mounted portion of the cryoelectronic receiver front end 96 in its basic embodiment for a single sector or omni base station. The cryostat 32 is attached to the cold head 92 and both are mounted in a weatherproof enclosure 52. The enclosure 52 has a door 100 for assembly, repair and maintenance functions. Other embodiments may use cylindrical or other enclosure shapes, with or without doors. The enclosure also includes mounting means for mounting it on an antenna mast. RF connectors 104 on the enclosure bottom provide signal input and output ports to the enclosure 52. Coaxial cables 106 provide connections between RF connectors 104 and RF ports 36 and 48 in the cryostat (being vacuum tight RF feedthroughs). The cold head cooling gas input and output lines 112 are connected to self-sealing gas connectors 116 on the bottom of the enclosure 52. Gas flow is only possible when the gas lines from the compressor 72 are connected to the cold head. Power for the cold head and the LNAs inside the cryostat is applied via power connectors 120 and 122, respectively. In other embodiments a common power connector may be used for the cold head and the LNAs. In yet another embodiment, power to the LNAs is provided via one of the coaxial cables 106 and RF connectors 104. In base stations with more than one sector, correspondingly more RF connectors 104, 36 and 48, and cables 106 are used.

In other embodiments the filter and the amplifier, or any of the other components listed above are fabricated not as individual components, and connected via coaxial cables, but may be fabricated as integrated circuits on one or more common substrates.

Figure 4:
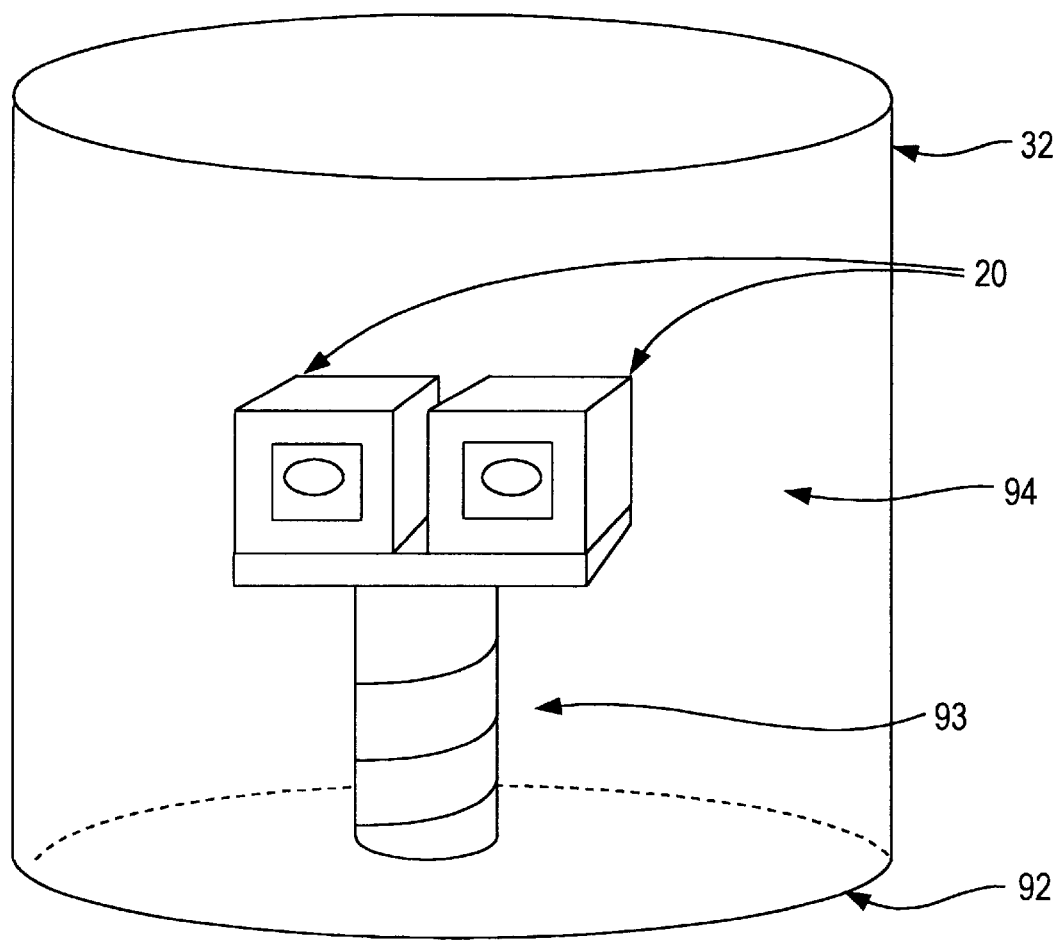
FIG. 4 is a cut away of a cryostat containing multiple cryoelectronic modules.

FIG. 4 depicts one basic embodiment of the mounting of the cryoelectronic modules to the coldhead inside the cryostat 32. The coldhead 92 has connected to it a cold finger 93 that stands out into the cryostat. At the top end of cold finger 93 the lowest temperature is achieved. In practice, there is a temperature gradient from the top of the adapter 94 to the bottom.

The mounting scheme, shown for single sector dual diversity applications, uses a mounting platform as the adaptor 94. The adaptor is composed of a material having a bulk conductivity of preferably at least about 2 watts/cm-K and more preferably at least about 4 watts/cm-K. Preferred materials are metals, such as aluminum, copper and alloys thereof, carbon, and sapphire, and composites thereof. The adaptor 94 desirably has a relatively high thermal inertia to slow the rate of heat transfer and therefore the rate of temperature rise in the system during power interruptions. Preferably, the thermal energy of the adaptor 94 ranges from about 5,000 to about 50,000 joules, more preferably from about 10,000 to about 40,000 joules, and most preferably from about 20,000 to about 30,000 joules. The ratio of the thermal energy of the adaptor to that of the cold finger preferably ranges from about 200:1 to about 100:1, and more preferably from about 50:1 to about 10:1. As will be appreciated, a number of configurations or shapes of the mounting platform can be employed to mount any two or more cryoelectronic modules at a desired position on the cold finger. Adaptor 94 is in tight thermal contact only at the top of the cold finger in order not to distribute cooling to the lower parts of the cold finger. Two cryoelectronic modules 20 are shown mounted on platform 94.

In general, it is not necessary that the amplifiers are operated at exactly the same temperature as the filters.

Amplifiers can be operated at higher temperatures than the filters and still be within an acceptable degree of insertion loss. Accordingly, the amplifiers can be located at a higher temperature along the cooling gradient existing along the cold finger and/or operated at a higher temperature by placing an thermally insulative material (i.e., a material having a thermal conductivity less than that of the adaptor) between the amplifier and the adaptor 94 to slow the rate of heat transfer from the amplifier.

The cryostat also includes radiative head shielding to minimize heat loading of the cryoelectronic module via thermal radiation from the cryostat walls, which are at ambient temperature. In minimizing the heat load to the cold head, it is also preferred that the RF cables to and from the cryoelectronic modules are chosen in such a way as to minimize heat conduction. These techniques are not unique to the invention but are standard practice in cryogenic operated systems.

Diagnostic Monitoring

To monitor the performance of the mast mounted portion of the cryoelectronic receiver front end diagnostic electronics may be included in the weatherproof enclosure and inside the cryostat. These sensor signals may be transmitted either analog format or digitally to the base station via a signal bus and may be used to identify equipment faults and activate alarm functions. The analog or digital acquisition circuitry includes but is not limited to temperature sensors for the filters and low noise amplifiers, cold head motor power sensor, cryocoolant line pressure sensor, and vacuum sensors, all with the comparative logic for comparing the measured data to pre-selected operating limits. If the data equals or exceeds the operating limit (s), an alarm is produced to alert operating personnel and/or activate an RF by-pass circuit.

RF Bypass Circuit

Figure 5:
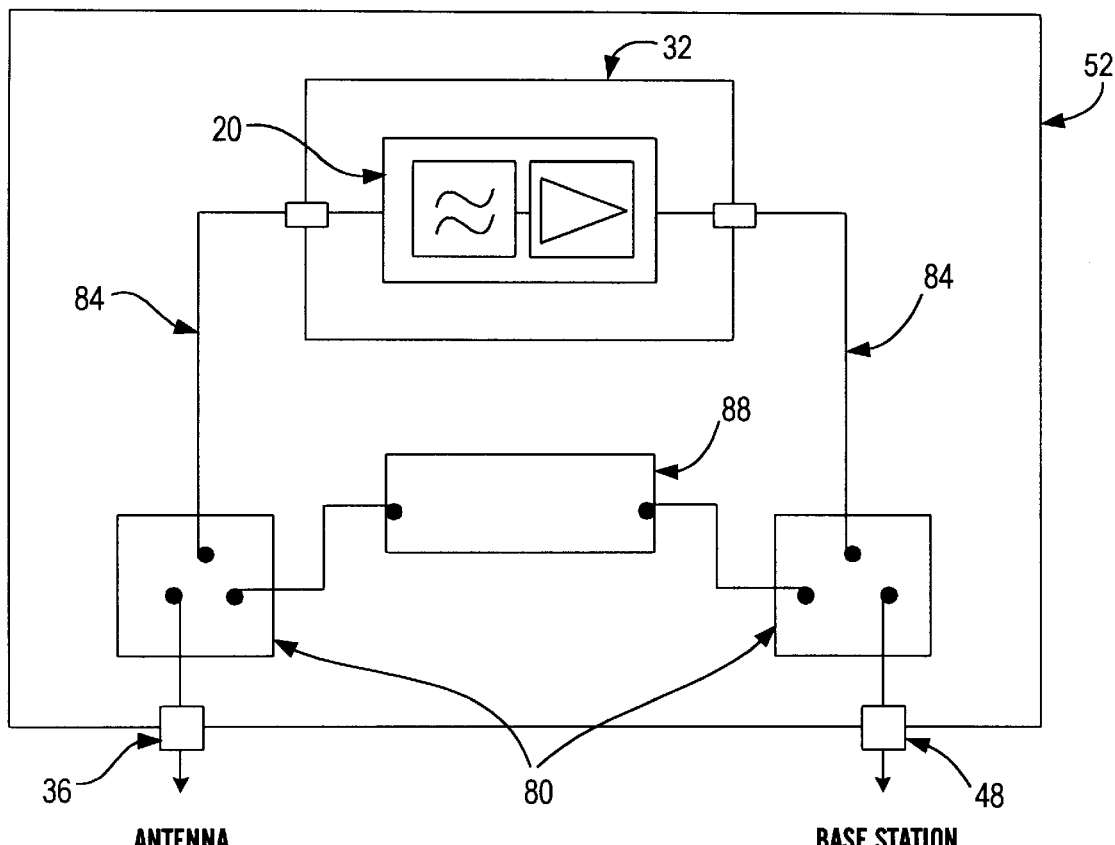
FIG. 5 is a block diagram of a cryoelectronic receiver front end with a bypass circuit.

FIG. 5 shows a block diagram of the RF bypass circuit that can be used to minimize the impact of a failure of the closed-cycle refrigerator or of one of the cryoelectronic modules. The circuit includes a pair of single pole double throw (SPDT) RF switches 80 that are inserted between the cryoelectronic receiver module 20 and the cables 84 on the one hand and the RF ports 36, 48 of the weatherproof enclosure on the other. During normal operation of the cryoelectronic receiver front end, the RF switches 80 are set in the position that connects the antenna to the input port 36 of the cryostat and the output port 48 to the base station. When power to the cryostat is lost, the temperature in the cryostat rises above a predetermined point (usually the critical temperature of the superconducting components), the vacuum in the cryostat decreases, one of the LNA fails, or another operating parameter is exceeded, the RF switches 80 automatically switch to their alternate positions. In this position, the antenna input signal at port 36 is connected to a by-pass circuit 88 to output port 48 and the base station. The by-pass circuit can be as simple as a coaxial cable or include an amplifier and a spectral filter to maintain the performance of the receiver front end at a minimally acceptable level.

ELECTRONICALLY TUNABLE FILTER

The spectral filters in the cryoelectronic module may be electronically tunable. This can for example be implemented with ferroelectric materials as disclosed in U.S. Pat. No. 5,472,935, which is incorporated herein by this reference. Tunable bandpass and bandreject filters may be used separately or in combination. The benefit of electronically tunable filters is that the frequency band can be shifted remotely without accessing the base station. Electronically tunable band reject filters may used to adaptively block strong out of band signals that are received by the antenna and degrade the signal to noise ratio of the communications channel. To provide such remote control to the cryoelectronic receiver front end, electrical control lines are added to the filter circuit that pass through the cryostat walls and are connected to a control circuit inside the weatherproof enclosure. The control circuit is then connected to the base station via additional analog or digital control lines.

Out-of-band interference can result from high RF power levels outside the band of interest creating more noise within the band of interest, which decreases the signal to noise ratio of the receiver front end. Such out-of-band signals can leak through the bandpass filter and into the amplifier. Such out-of-band interference is often due to transmit signals radiated from antennas in close proximity to the receiver front end, or to different wireless systems which service the same geographic area but operate at different frequencies. Bandpass filters are designed to reject signals outside the desired frequency range, but the magnitude of the rejection, and thus effectiveness for rejecting undesirable signals, varies as a result of filter design and filter type. It is an objective of this invention to increase the magnitude of rejection and thus decrease the out-of-band interference by using cryogenically cooled superconducting filters in the receiver front end.

MULTIPLE COLD HEADS

Figure 6:
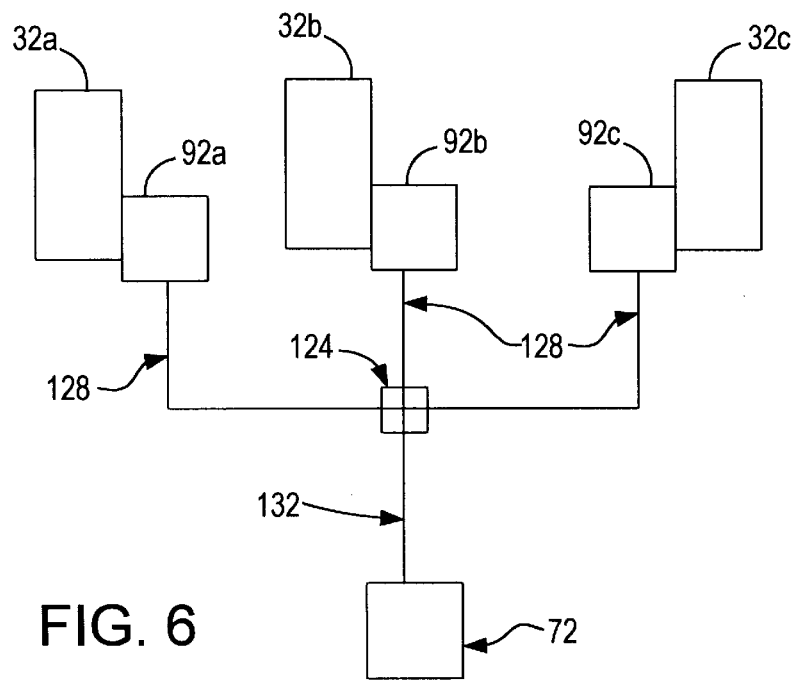
FIG. 6 is a block diagram of a cryoelectronic receiver front end system where multiple cryostats are supplied with cooling fluid by a single compressor.

FIG. 6 depicts a block diagram of a cryoelectronic receiver front end network, where several cold heads 92a, b,c, each connected to a single evacuated vessel 32a,b,c that houses one or more cryoelectronic modules, are all supported by a single compressor 72. Each cold head 92a,b,c is connected to a gas manifold 124 via coolant fluid lines 128. A single pair of fluid lines 132 connects the manifold 124 to the compressor 72. For clarity, the RF connections are not shown in this figure. The configuration shown allows a single compressor 72 to support multiple mast mounted cryoelectronic receiver front ends that may be co-located on the same mast, or separated by distances up to ½ mile from the compressor. In applications, where more cryoelectronic modules are needed than can be integrated into a single cryostat, the use of multiple mast mounted cryoelectronic receiver front ends supported by a single compressor saves installation cost.

Fault Tolerant Dual Diversity Antenna System

Figure 7:
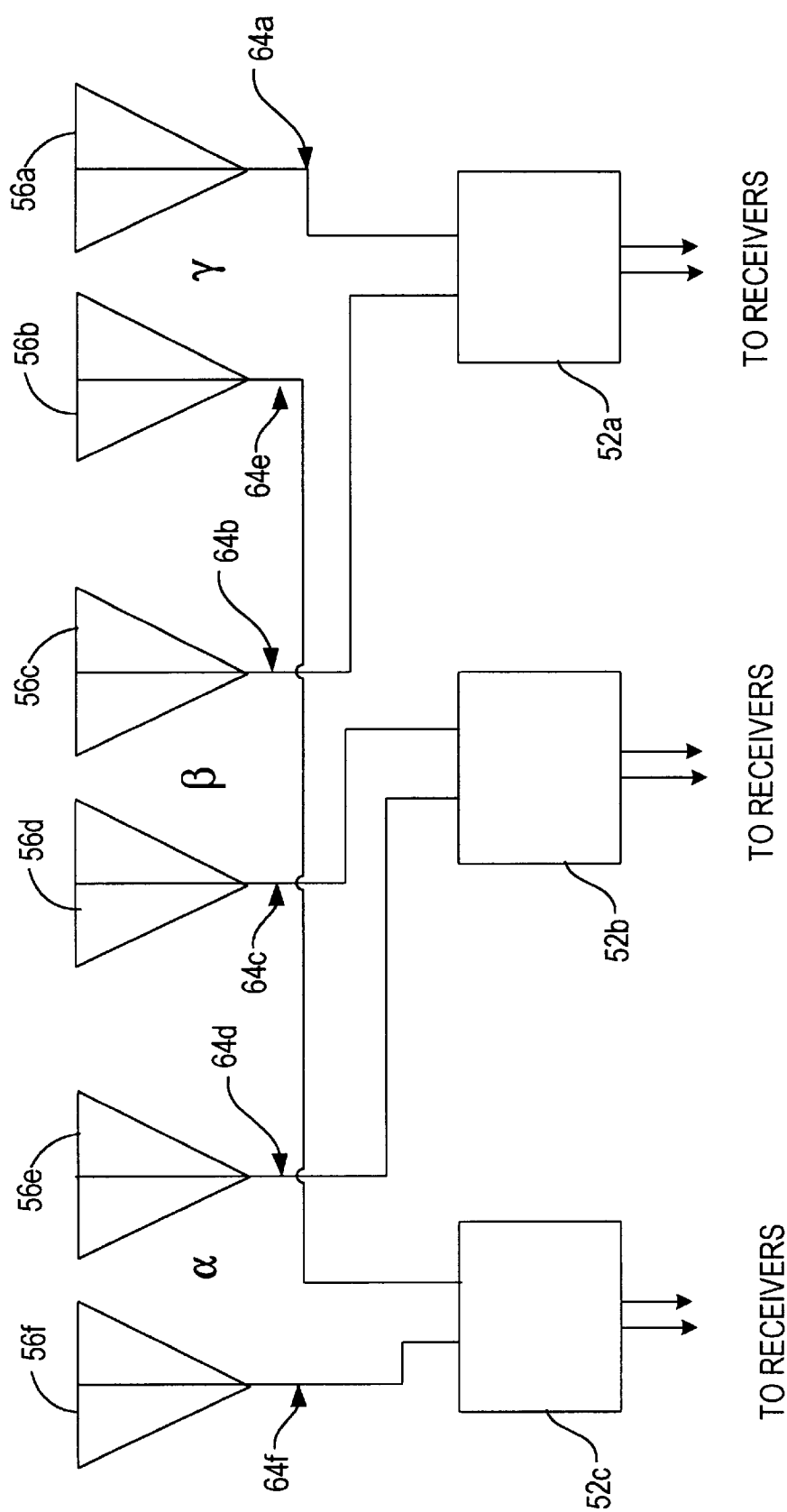
FIG. 7 is a block diagram of a fault-tolerant configuration of multiple cryoelectronic receiver front ends supporting a sectorized dual-diversity antenna system.

FIG. 7 depicts a block diagram of a mast mounted cryoelectronic receiver front end supporting a base stations with three sectors in a fault-tolerant configuration. As shown here six receive antenna structures 56a–f are used to provide a three-sectored, dual diversity antenna system. Three cryoelectronic receiver front ends 52a–c are used, with each front end containing two cryoelectronic modules. Coax cables 64a–f from the antenna structures 56a–f are connected to the cryoelectronic receiver front ends 52a–c in such a manner that the two antenna structures in each sector (a, b, g) are connected to separate cryoelectronic receiver front ends. In this manner, if a single cryostat fails, two sectors are degraded, but all sectors remain functional.

Integrated Antenna

A further performance improvement of the present invention is possible by essentially eliminating the cable between the mast mounted cryogenic receiver front end and the receive antenna.

Figure 8B:
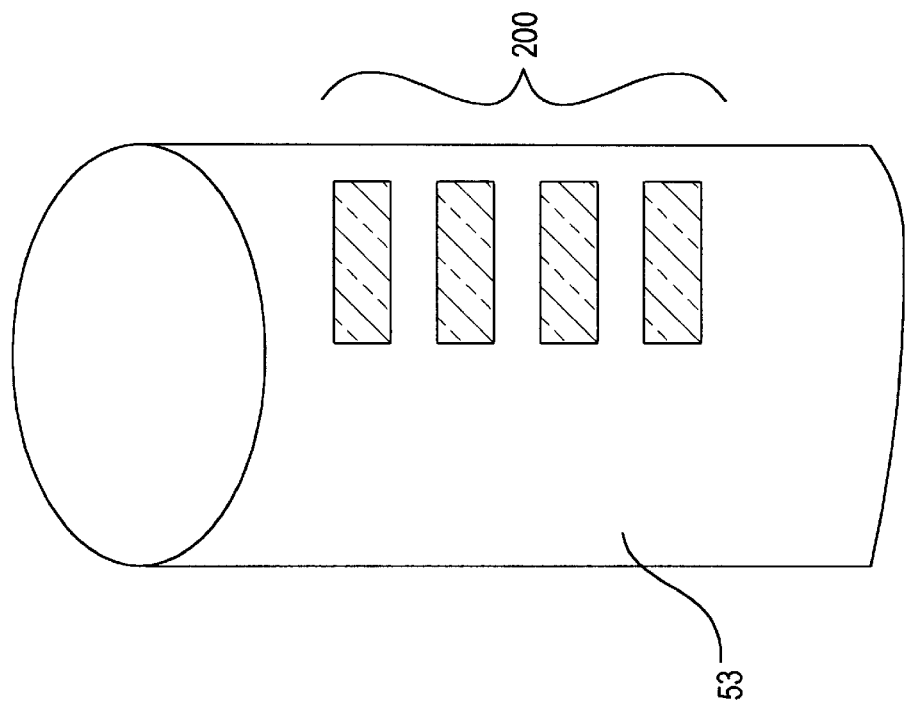
FIG. 8B is a view of the integrated antenna and cryoelectronic receiver front end.
Figure 8A:
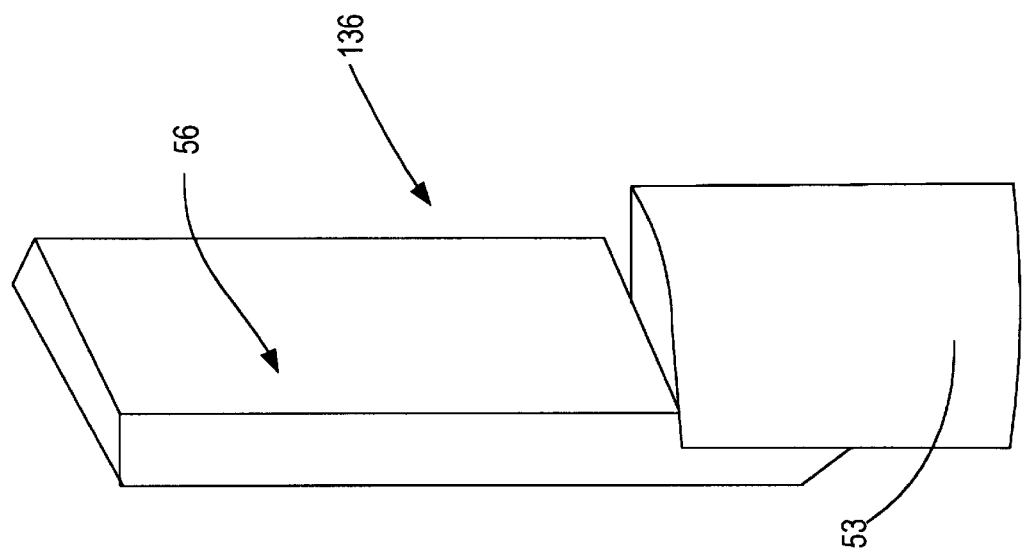
FIG. 8A is a simplified perspective view of a dual-antenna system where the antenna and cryoelectronic receiver front end are integrated into a single unit.

FIG. 8A is a simplified perspective view of an antenna configuration 136 where the antenna 56 is integrated with the mast mounted portion 53 of the cryoelectronic receiver front end. This arrangement minimizes the losses between the antenna and the receiver. Another embodiment of an integrated antenna is shown in FIG. 8B, where a linear array of conformal radiating patches 200 is part of the cylindrical weather proof enclosure 96. As will be appreciated, the conformal radiating patches substitute for the antenna 56. Such an integrated embodiment is also desirable for smart antenna systems, where cryogenically cooled tunable phase shifters are used to electronically steer the antenna beam. The phase shifters can be mounted inside the cryostat with the cryoelectronic modules. Smart antenna systems are under development now by a number of companies. Many of these systems require tunable phase shifters and control electronics co-located with the antenna structure.

Coolant Fluid Transportation

Figure 9:
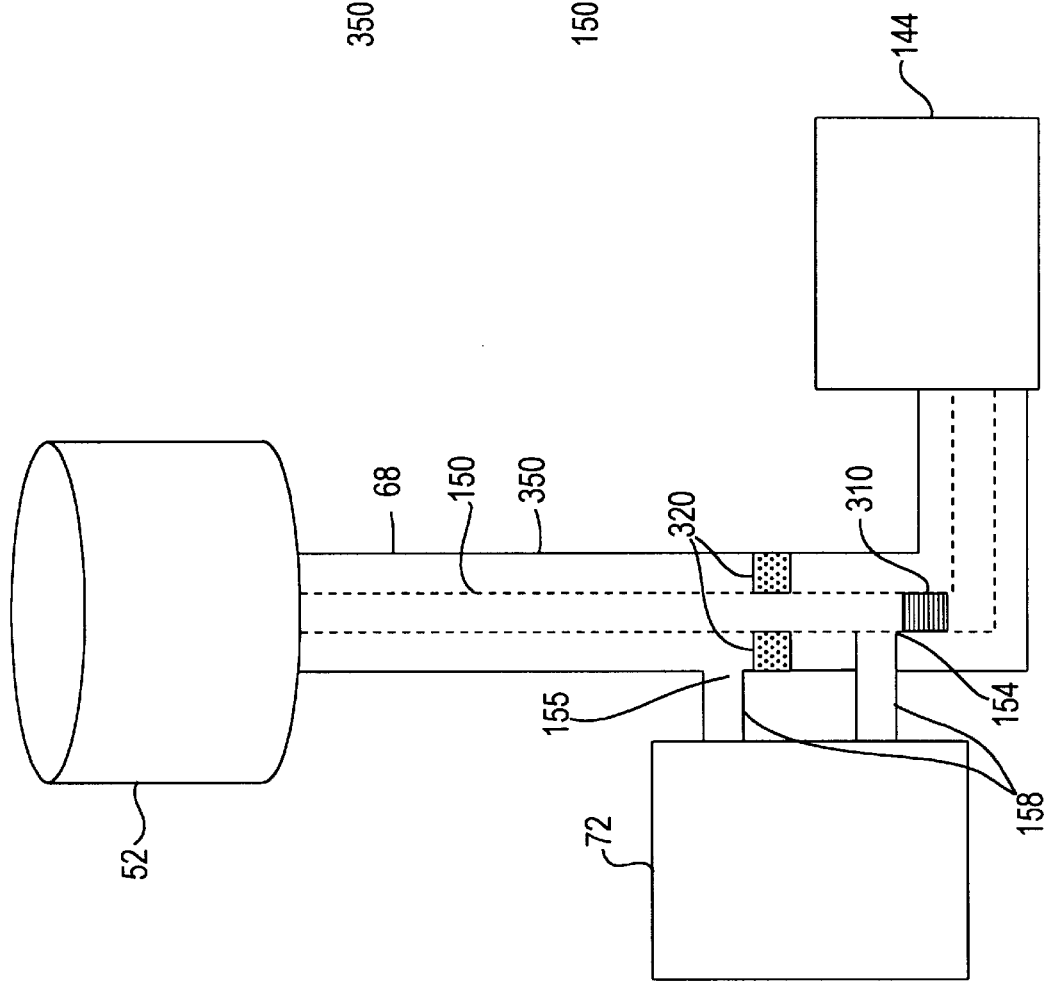
FIG. 9 is a block diagram of a coax cable being used to transport cooling fluid to/from the cryoelectronic receiver front end.

FIG. 9 is a block diagram depicting the use of a coaxial cable for transporting coolant fluid from the compressor 72 to the cryoelectronic receiver front end in the mast mounted portion 53. The coaxial cable 68 carries the filtered and amplified RF signal from the cryoelectronic receiver front end to the base station 144.

Figure 10:
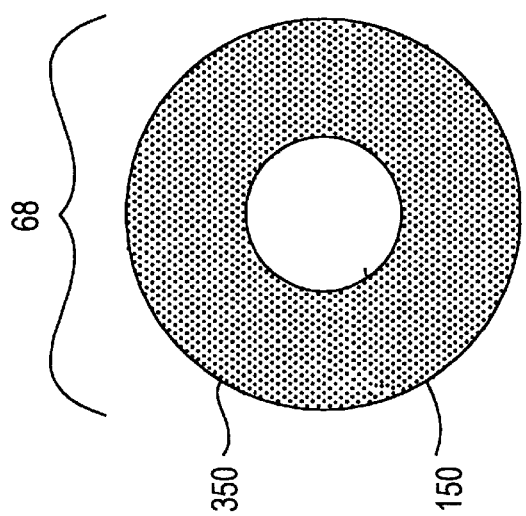
FIG. 10 is a cross-sectional view of the coax cable in FIG. 9 showing a conduit for transporting the cooling fluid.

FIG. 10 is a cross-sectional view of the coaxial cable 68 showing a hollow inner conductive conduit 150 which is partially responsible for carrying the filtered and amplified RF signal, and is suspended within the outer conductor 350 of the cable 68. The cooling fluid is transported within the conduit 150.

In a first embodiment, referring again to FIG. 9, the cooling fluid is introduced into the inner conduit by using a conductive plug 310 in the conduit 150 "downstream" of the junction 154 to prevent the cooling fluid from flowing down the conduit 150 to the base station 144. Electrically insulative tubing 158 is used to input or output the cooling fluid from the compressor 72 into the conduit 150. The electrically insulative tubing prevents the filtered and amplified RF signal from being removed from the conduit 150 upstream of the station 144. Electrically insulating tubing 158 is also used to input or output the fluid from the conduit 150 into the cooler (not shown) in the cryoelectronic receiver front end 53. A conductive plug is also used to prevent the fluid from flowing up the conduit past the junction with the tubing and into the amplifier.

In a second embodiment, the fluid is transported in the volume of the coaxial cable located between the outer conductor 350 and the inner conductor 150. An electrically insulating plug 320 is located "downstream" of the junction 155 to prevent the cooling fluid from flowing down the coaxial cable 68 to the base station 144.

In a third embodiment, the two previous embodiments are combined such that the fluid is transported in both volumes of the coaxial cable. This has the advantage that the cooling gas can be delivered and removed from the cold head via a single coaxial cable. For example, cooling fluid can be transported from the compressor to the cold head through the hollow inner conductor (described in the first embodiment), and cooling fluid can be transported from the cold head to the compressor through the volume of the coaxial cable located between the outer conductor 350 and the inner conductor 150 (described in the second embodiment).

In a fourth embodiment, the coaxial cable 68 is enclosed in a hollow structure (not shown), and the cooling fluid is transported in the volume located between the inner wall of the hollow structure and the outer wall 350 of the coaxial cable 68.

These embodiments reduce the number of cables that are required between the mast mounted portion of the receiver front end and the compressor and the base station, which in turn will lower the total weight and cost of the cables.

Lightning Protection Circuitry

Electromagnetic radiation surges can be introduced to mast mounted electronics during thunder storms when lightning strikes hit the vicinity of the base station or the base station itself. Mast head electronics can be provided with lightning protection circuitry for grounding such electromagnetic radiation surges. Such circuitry may be included at all RF input and output ports and all power and signal/control ports of the weatherproof enclosure. The inclusion of these circuits provides a mast mounted receiver front end that is extremely reliable and possesses significant system enhancements over the prior art.

Experiment

Figure 11A:
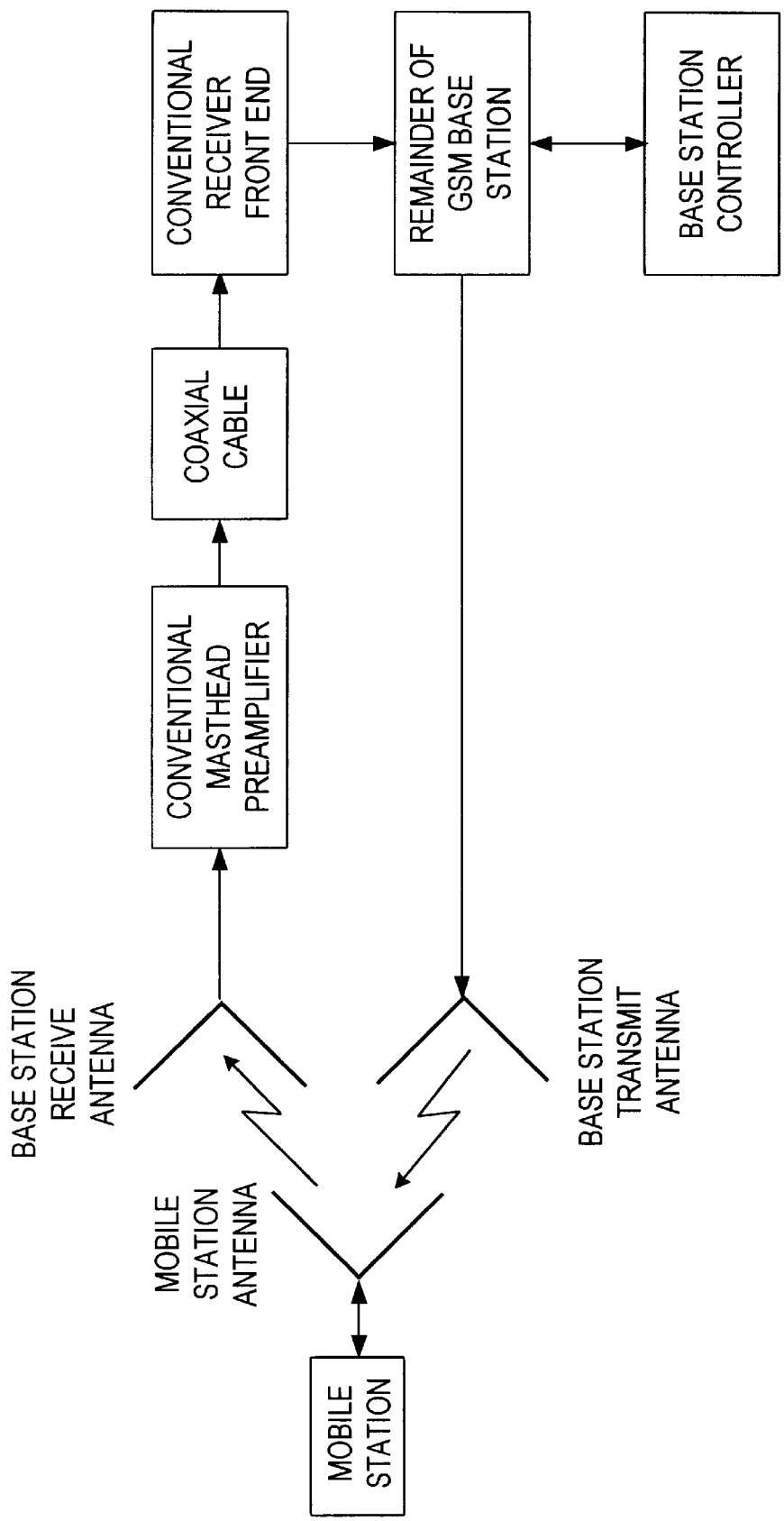
FIGS. 11A and 11B respectfully depict prior art base station circuitry and a base station circuitry using the cryoelectronic receiver of the present invention.
Figure 11B:
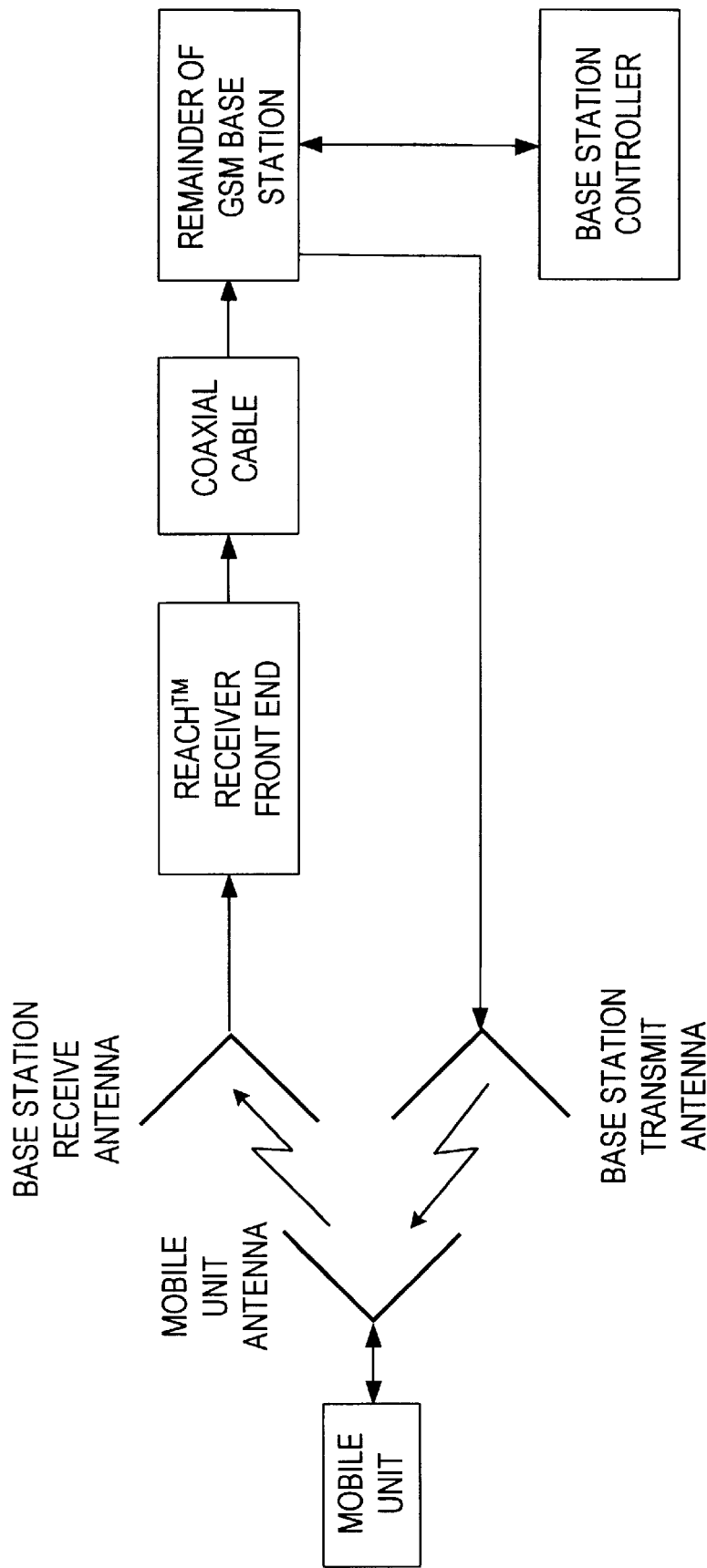
Figure 12A:
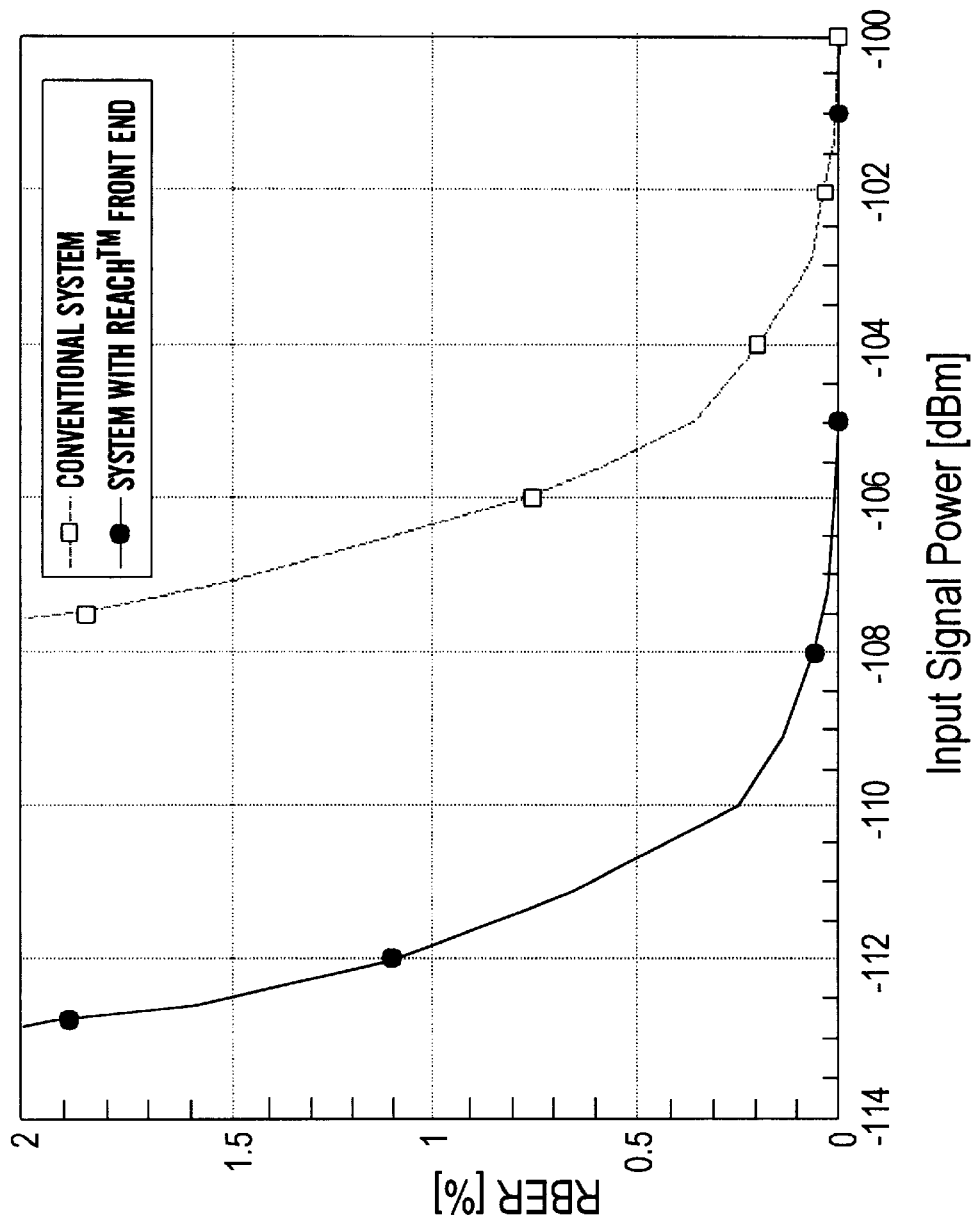
FIGS. 12A and B depict results of tests using the systems of FIG. 11A and B.
Figure 12B:
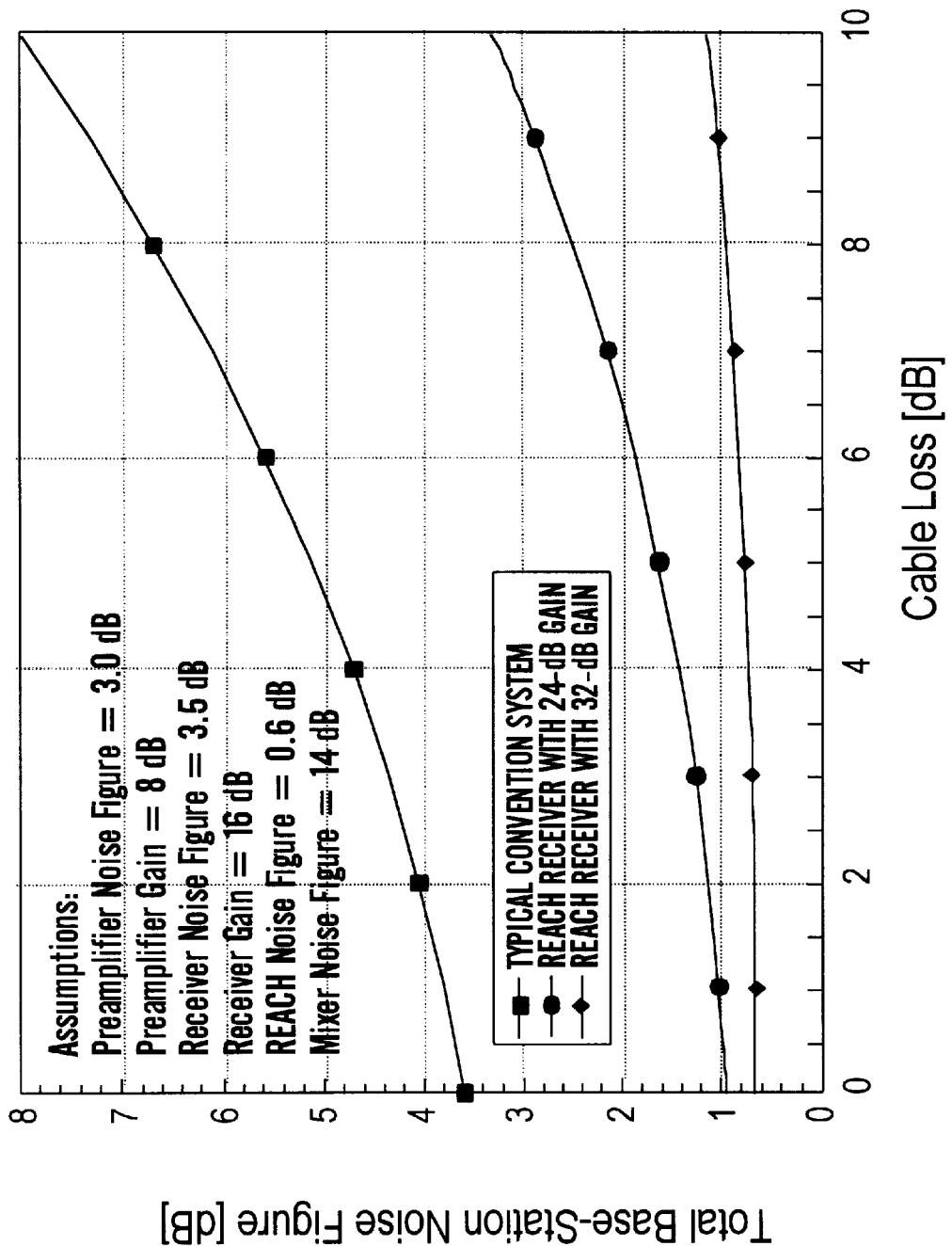

The performances of a conventional base station having the components shown in FIG. 11A and of a base station according to the present invention having the components shown in FIG. 11B were compared. The performances were tested under actual conditions using the same mobile station. The results of the tests are presented in FIGS. 12A and 12B. The vertical axis of FIGS. 12A and 12B plots the percent residual bit error rate ("RBER") and the horizontal axis the input signal power of the mobile station. The graph shows that for a smaller mobile station input signal level, one can achieve the same RBER (i.e., accuracy) with the base station of FIG. 11B as with the base station of FIG. 11A. Stated another way, for a given mobile station input signal power, the base station of FIG. 11B provides a superior RBER than the base station of FIG. 11A. It has been discovered that the base station of FIG. 11B has at least a 6 db improvement in bit-per-second receiver sensitivity compared to that of FIG. 11A. The vertical axis of FIG. 12B plots the total noise figure of the base station and the horizontal axis the cable loss. As can be seen from FIG. 12B, the base station using the system of FIG. 11B has a consistently lower noise figure for a given cable loss than the base station using the conventional system of FIG. 11A.

Modifications and adaptations of those embodiments will occur to those skilled in the art. It is to be expressly understood, however, that such modifications and adaptations are within the scope of the present invention, as set forth in the appended claims.

What is claimed is:

1. In a mobile radio system in which the base station has an antenna and a receiver front end connected to the antenna by a transmission line, comprising:
   (a) a receiver front end including:
      (i) a plurality of filtering means for spectrally filtering an RF signal to form at least one filtered RF signal; and
      (ii) a plurality of amplifying means, in communication with the at least one filtering means, for amplifying the at least one filtered RF signal to form at least one amplified signal, wherein at least one of the filtering means and plurality of amplifying means includes a superconductor material; and
   (b) at least one cryocooling means for cryogenically cooling the plurality of filtering means and the plurality of amplifying means, wherein the receiver front end and cryocooling means are mounted on a tower substantially adjacent to the antenna to provide an insertion loss along a transmission line between the antenna and the receiver front end of no more than about 1.5 dB and wherein a cold finger in the cryocooling means simultaneously engages the plurality of filtering means and amplifying means.

2. The mobile radio system as claimed in claim 1, wherein the length of the transmission line is sufficient to produce an insertion loss along the transmission line of no more than about 0.5 db.

3. The mobile radio system as claimed in claim 1, wherein the length of the transmission line is sufficient to produce a noise figure for the receiver front end of no more than about 1.0 dB.

4. The mobile radio system as claimed in claim 1, wherein the plurality of filtering means includes the superconductor material.

5. The mobile radio system as claimed in claim 1, wherein the cryocooling means maintains the plurality of filtering means and amplifying means at a substantially stable temperature that is substantially independent of the temperature of the environment external to the cryocooling means.

6. The mobile radio system as claimed in claim 1, wherein a filtering means of the plurality of filtering means and an amplifying means of the plurality of amplifying means are located on a common substrate.

7. The mobile radio system as claimed in claim 1, wherein the plurality of filtering means are electronically tunable.

8. The system as claimed in claim 7, wherein the plurality of filtering means comprises a tuning means that includes a ferroelectric material.

9. A system for receiving RF signals, comprising:
   an antenna for receiving an RF signal;
   a tower for elevating the antenna relative to obstructions in the path of the RF signal; and
   a receiver front end mounted on an upper portion of the tower in close proximity to the antenna, wherein the receiver front end comprises:
      a plurality of superconducting planar filters for spectrally filtering the RF signal to form a corresponding plurality of filtered RF signals;
      a plurality of amplifiers for amplifying the plurality of filtered RF signals to form a corresponding plurality of amplified RF signals; and
   a cryocooler mounted on the tower for cryogenically cooling the plurality of superconducting planar filters and the plurality of amplifiers, wherein the cryocooler includes a cold finger for simultaneously engaging the plurality of superconducting planar filters and amplifiers.

10. The system as claimed in claim 9, wherein an amplifier of the plurality of amplifiers comprises a superconducting material.

11. The system as claimed in claim 9, wherein the plurality of superconducting planar filters and the plurality of amplifiers are contained within a common cryostat.

12. The system of claim 9, further comprising a transmission line extending between the antenna and the receiver front end and wherein an insertion loss along the transmission line is no more than about 1.5 db.

13. The system of claim 9, wherein the cryocooler maintains the plurality of superconducting planar filters and plurality of amplifiers at a substantially stable temperature that is substantially independent of the temperature of the environment external to the cryocooler.

14. The system of claim 9, wherein a superconducting planar filter of the plurality of superconducting planar filters and an amplifier of the plurality of amplifiers are located on a common substrate.

15. The system of claim 9, wherein the plurality of superconducting planar filters are each electronically tunable.

16. The system of claim 15, wherein the plurality of superconducting planar filters each include a ferroelectric material.

17. A method for processing a wireless signal transmitted by a mobile station to a base station, comprising:
(a) cryogenically cooling a receiver front end in said base station with a cryocooler, wherein the receiver front end, cryocooler and an antenna for receiving the wireless signal are mounted on an elevating structure for elevating the antenna relative to obstacles in the path of the wireless signal and wherein the receiver front end includes a plurality of filters and amplifiers and wherein the cryocooler includes a cold finger that simultaneously engages the plurality of filters and amplifiers;
(b) receiving and processing said signal with said receiver front end to form a processed signal; and
(c) transmitting said processed signal from the receiver front end to said base station.

18. The method as claimed in claim 17, wherein the receiver front end comprises a superconducting material having a superconductor transition temperature and in the cryogenically cooling step, the receiver front end has a temperature that is no more than about 90% of the superconductor transition temperature.

19. The method of claim 17, further comprising a transmission line extending between the antenna and the receiver front end and wherein an insertion loss associated with the transmission line is no more than about 1.5 db.

20. The method of claim 17, wherein a filter and an amplifier of the plurality of filters and amplifiers are located on a common substrate.

21. The method of claim 17, further comprising the step of altering a voltage applied to a dielectric material in a filter of the plurality of filters and amplifiers to alter a characteristic of the signal during processing of the signal.

22. A system for receiving signals, comprising:
a receiver front end, the receiver front end including a plurality of planar filters for filtering a wireless signal to form a plurality of filtered signals and a corresponding plurality of amplifiers for amplifying the plurality of filtered signals to form a corresponding plurality of amplified signals; and
a cryocooler for cryocooling the receiver front end and for mounting on an antenna structure near an antenna, the cryocooler including a cold finger for engaging simultaneously the plurality of planar filters and the plurality of amplifiers.

23. The system of claim 22, wherein at least one of the plurality of planar filters and plurality of amplifiers includes a superconducting material and the cryocooler is mounted on the antenna structure.

24. The system of claim 22, wherein a planar filter of the plurality of planar filters and amplifier of the plurality of amplifiers are located on a common substrate.

25. The system of claim 22, wherein a transmission line extends from the antenna to the receiver front end and an insertion loss associated with the transmission line is no more than about 1.5 db.

26. The system of claim 22, wherein the plurality of planar filters and the plurality of amplifiers are located in a common cryostat.

27. The system of claim 22, wherein the cryocooler is to be mounted at the base of the antenna.

28. The system of claim 22, wherein the antenna structure includes a tower supporting the antenna and the cryocooler is to be mounted on the tower supporting the antenna.

29. A method for installing a receiver front end on a structure supporting an antenna, comprising:
providing a receiver front end, the receiver front end including a plurality of planar filters for filtering a wireless signal to form a plurality of corresponding filtered signals and a plurality of amplifiers for amplifying the plurality of filtered signals to form a corresponding plurality of amplified signals; and a cryocooler for cryocooling the receiver front end, the cryocooler including a cold finger that engages simultaneously the plurality of planar filters and the plurality of amplifiers;
mounting the cryocooler on the antenna structure near an antenna; and
connecting a transmission line with the antenna and the receiver front end.

30. The method of claim 27, wherein at least one of the plurality of planar filters and plurality of amplifiers includes a superconducting material.

31. The method of claim 27, wherein a planar filter of the plurality of planar filters and an amplifier of the plurality of amplifiers are located on a common substrate.

32. The method of claim 27, wherein an insertion loss associated with the transmission line is no more than about 1.5 db.

33. The method of claim 27, wherein the plurality of planar filters and the plurality of planar amplifiers are located in a common cryostat.

34. The method of claim 29, wherein the cryocooler is mounted at the base of the antenna.

35. The method of claim 29, wherein the antenna structure includes a tower supporting the antenna and the cryocooler is mounted on the tower supporting the antenna.

* * * * *